(12) United States Patent
Wang et al.

(10) Patent No.: US 11,059,171 B2
(45) Date of Patent: Jul. 13, 2021

(54) METHOD AND APPARATUS FOR OPTIMIZING A TARGET WORKING LINE

(71) Applicant: ABB Schweiz AG, Baden (CH)

(72) Inventors: Ling Wang, Shanghai (CN); Shaojie Cheng, Shanghai (CN); Roy Fraser, Cheshire (GB); Yan Xu, Shanghai (CN); Wenqi Yeo, Singapore (SG); Yanlai Wu, Shanghai (CN)

(73) Assignee: ABB Schweiz AG, Baden (CH)

( * ) Notice: Subject to any disclaimer, the term of this patent is extended or adjusted under 35 U.S.C. 154(b) by 257 days.

(21) Appl. No.: 16/360,586

(22) Filed: Mar. 21, 2019

(65) Prior Publication Data

US 2019/0217470 A1 Jul. 18, 2019

Related U.S. Application Data

(63) Continuation of application No. PCT/CN2016/106857, filed on Nov. 23, 2016.

(51) Int. Cl.
*B25J 9/16* (2006.01)
*B25J 9/00* (2006.01)
*G05B 19/418* (2006.01)

(52) U.S. Cl.
CPC ........... *B25J 9/1661* (2013.01); *B25J 9/0093* (2013.01); *B25J 9/1664* (2013.01); *B25J 9/1671* (2013.01);
(Continued)

(58) Field of Classification Search
CPC .... G05B 19/41815; G05B 2219/39391; G05B 2219/36252; G05B 2219/40308;
(Continued)

(56) References Cited

U.S. PATENT DOCUMENTS 9,561,587 B2 * 2/2017 Wellman ................ B25J 9/1669
9,669,543 B1 * 6/2017 Stubbs .................. H05K 999/99
(Continued)

FOREIGN PATENT DOCUMENTS

CN 1670643 A 9/2005
CN 1806940 A 7/2006
(Continued)

OTHER PUBLICATIONS

European Patent Office, Extended European Search Report issued in corresponding European application No. 16922152.0, dated Jul. 13, 2020, 11 pp.
(Continued)

*Primary Examiner* — Robert T Nguyen
*Assistant Examiner* — Dylan M Katz
(74) *Attorney, Agent, or Firm* — Taft Stettinius & Hollister LLP

(57) ABSTRACT

A method and an apparatus for optimizing a target working line are disclosed. The target working line includes at least one robot manipulator, at least one conveyor and at least one item on the conveyor to be displaced by the robot manipulator. The method includes: obtaining an evaluation model for the target working line, the evaluation model yielding an overall success rate of moving the item from one conveyor to another conveyor based on at least one measuring parameter, the measuring parameter being a physical attribute of the target working line; yielding the overall success rate for the target working line as a function of a value for the measuring parameter for the target working line; and in case that the yielded overall success rate is lower than a predetermined threshold rate, updating a value for a configuring parameter based on the overall success rate, the configuring parameter corresponding to the measuring parameter, and the configuring parameter being states of the working line.

(Continued)

The optimization of the evaluation model does not require an implementation of an on-site process or an involvement of an experienced engineer or worker. Instead, simulation software can be used to obtain customized parameters used for the target working line, resulting in an increased success rate within a short period of time.

18 Claims, 2 Drawing Sheets

(52) U.S. Cl.
    CPC ...... *B25J 9/1697* (2013.01); *G05B 19/41815* (2013.01); *G05B 2219/32294* (2013.01); *G05B 2219/39391* (2013.01); *Y02P 90/02* (2015.11)

(58) Field of Classification Search
    CPC  G05B 2219/32294; G05B 2219/39106; Y02P 90/02; B25J 9/0093
    See application file for complete search history.

(56) References Cited

U.S. PATENT DOCUMENTS

| | | |
|---|---|---|
| 2007/0135932 A1 | 6/2007 | Pannese |
| 2007/0244599 A1 | 10/2007 | Tsai et al. |
| 2008/0301072 A1 | 12/2008 | Nagatsuka et al. |
| 2011/0218649 A1 | 9/2011 | Ast et al. |
| 2017/0080566 A1* | 3/2017 | Stubbs ..................... B25J 9/163 |

FOREIGN PATENT DOCUMENTS

| | | |
|---|---|---|
| CN | 101652229 A | 2/2010 |
| CN | 106021733 A | 10/2016 |
| WO | 2008085937 A2 | 7/2008 |
| WO | 2012164126 A1 | 12/2012 |
| WO | 2016/100235 A1 | 6/2016 |

OTHER PUBLICATIONS

State Intellectual Property Office of the P.R. China, International Search Report & Written Opinion issued in corresponding Application No. PCT/CN2016/106857, dated Aug. 23, 2017, 14 pp.

* cited by examiner

METHOD AND APPARATUS FOR OPTIMIZING A TARGET WORKING LINE

TECHNICAL FIELD OF THE INVENTION

Example embodiments disclosed herein generally relate to a method of optimizing a target working line, and also to an apparatus for optimizing the target working line.

BACKGROUND OF THE INVENTION

In logistics industry or other industries, robots are widely used for picking objects. In some scenarios, objects on a conveyor needs to be picked by a robot manipulator and then to be placed on another conveyor by the same robot manipulator. Objects such as boxes are randomly placed directly on the conveyor or in a container on the conveyor. When objects or items are placed randomly on a conveyor, a programmable application can be used to perform pick and place operations by the robot manipulator. A vision system can be used to find randomly placed objects or items on conveying belts. These products use comprehensive graphical or other forms of interfaces to configure powerful applications, by which they can control multiple robots to pick and place detected items on different conveying belts.

A working line usually includes a number of components or elements, such as one or more robots, corresponding grippers (namely, the manipulators), one or more conveyors, one or more cameras, I/O interfaces and other external devices. Engineers need to configure necessary parameters or configuring parameters for all these devices or elements so as to yield a higher success rate of transferring an object from one conveyor to another conveyor.

Nowadays, engineers need to define the initial configuring parameters based on they experience. Great efforts on site tuning of these configuring parameters need to be done to achieve a relatively satisfying success rate. This process requires an experienced engineer or worker, and is also time consuming. It is therefore required by the industry to tune the configuring parameters faster so as to pick and place the objects in the working line accurately.

SUMMARY OF THE INVENTION

Example embodiments disclosed herein propose a method of optimizing a target working line. It is thus one of the objectives to improve the success rate of the target working line after the optimization according to the present disclosure.

In one aspect, example embodiments disclosed herein provide a method of optimizing a target working line. The target line includes at least one robot manipulator, at least one conveyor and at least one item on the conveyor to be displaced by the robot manipulator. The method includes: obtaining an evaluation model for the target working line, the evaluation model yielding an overall success rate of moving the item from one conveyor to another conveyor based on at least one measuring parameter, the measuring parameter being a physical attribute of the target working line; yielding the overall success rate for the target working line as a function of a value for the measuring parameter for the target working line; and in case that the yielded overall success rate is lower than a predetermined threshold rate, updating a value for a configuring parameter based on the overall success rate, the configuring parameter corresponding to the measuring parameter, and the configuring parameter being states of the working line.

In another aspect, example embodiments disclosed herein provide an apparatus for optimizing a target working line. The working line includes at least one robot manipulator, at least one conveyor and at least one item on the conveyor to be displaced by the robot manipulator. The apparatus includes a controller configured to obtain an evaluation model for the target working line, the evaluation model yielding an overall success rate of moving the item from one conveyor to another conveyor based on at least one measuring parameter, the measuring parameter being a physical attribute of the target working line; yield the overall success rate for the target working line as a function of a value for the measuring parameter for the target working line; and in case that the yielded overall success rate is lower than a predetermined threshold rate, update a value for a configuring parameter based on the overall success rate, the configuring parameter corresponding to the measuring parameter, and the configuring parameter being states of the working line.

Through the following description, it would be appreciated that the apparatus or method according to the present disclosure provides a closed loop for tuning the parameters for the evaluation model automatically in software level. An evaluation model can be intentionally selected and assigned to a particular working line. The optimization of the evaluation model does not require an implementation of an on-site process or an involvement of an experienced engineer or worker. Instead, simulation software can be used to obtain customized parameters used for the particular (target) working line, resulting in an increased success rate within a short period of time.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION OF THE INVENTION

Figure 1:
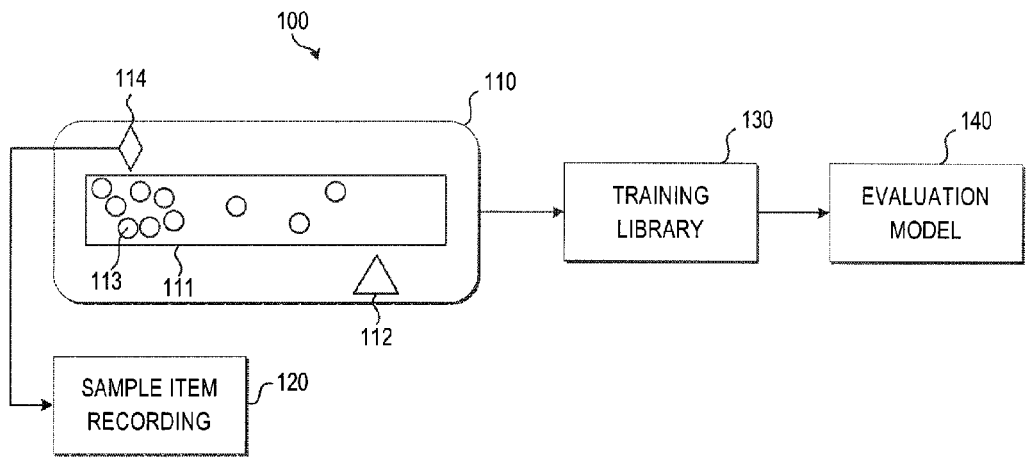
FIG. 1 illustrates an example process flow of initializing an evaluation model in accordance with one example embodiment.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-7. Other definitions, explicit and implicit, may be included below.

FIG. 1 shows an example process flow 100 of initializing an evaluation model. The evaluation model is a model outputting a rate based on a number of factors. The rate is used to predict or yield a percentage of successfully grabbing an item on a conveyor to placing the same item onto another conveyor. Each of the factors will affect the success rate and thus the factors can be called measuring parameters. The evaluation model can be built based on numerous on-site studies or experiences from the on-site engineers/workers. In some other examples, the evaluation model can be initialized automatically in the course of the picking/placing processes by a program. The constructions of the evaluation model will be detailed in the following with reference to FIG. 4.

In FIG. 1, a working line 110 is shown. The working line 110 can be an on-site line or in-situ line ("on-site" and "in-site" are used interchangeably in this context, referring to a real working line in a factory or workshop) containing at least one conveyor 111 for transporting some items or items 113 thereon. The working line 110 also has at least one robot 112, which is used to pick the items 113 on the conveyor 111. The robot 112 usually picks an item 113 at a time by its manipulator (not shown). The working line 110 can include another conveyor 111 although FIG. 1 merely shows one. In case that there are two conveyors, the robot 112 may need to pick an item 113 from one conveyor to another conveyor. In this case, manipulator(s) may fail to pick or move or place the item 113 in the whole process, thus leading to a failure. It is therefore important for an on-site working line to minimize the failure rate, namely, to increase the overall success rate. A camera 114 can be provided in the working line 110 to record a video clip. The video clip can be analyzed by the program mentioned above to initialize the evaluation model. Therefore, it is not necessary to carry out the process 100 in an on-site working line 110. Instead, a simulation can be done in a proper program or in software level.

In a common working line 110, the items 113 are put on the conveyor 111 randomly, and thus the robot 112 may incorporate a sensor to detect the positions, velocities, sizes and other attributes of the items 113. Alternatively, the video clip recorded by the camera 114 can be analyzed for a controller to control the motion of the robot 112 so as to pick the items 113. However, the analysis or detection is not accurate enough for the robot 112 to pick the items 133 successfully each time. Sometimes the manipulator of the robot 112 fails to pick an item or have it dropped when moving the item to another conveyor. Whether it fails or not depends on many factors such as the speed of the manipulator, the speed of the item, the weight (mass) of the item and the like. These factors are used as the measuring parameters for the evaluation model, because they all affect the total success rate.

In one embodiment, if the working line 110 is an on-site line, the camera 114 will output a sample item recording which records distributions and patterns of the items 113 on the conveyor 111. The recording can be used later for extracting the measuring parameters for that working line 110. The sample item recording is represented by a block 120 in FIG. 1.

In one embodiment, the working line 110 is followed by a training library block 130, in which the evaluation model is to be trained. The training process in the block 130 will improve the accuracy of the evaluation model by means of the provided working line 110. Because each and every working line 110 may be different, the evaluation model will be more accurate (so as to correctly reflect the relationship between the measuring parameters and the success rate) if a large number of working lines are considered in the training process. For example, even if all the measuring parameters affecting the success rate are found, their weights need to be adjusted for different types of working lines. The training process can be done manually by an experienced user who is familiar with the working line that is being trained, or it can be done by an expert remotely after watching the captured video clip. Alternatively, an analyzing program can be applied to adjust the evaluation model for describing the particular working line. After the working line is trained with a more accurate evaluation model obtained for that working line, the evaluation model can be recorded in a training library. Therefore, if a similar working line is to be optimized in the future, the evaluation model can be selected from the library, which greatly increases the efficiency.

In this example, as shown in FIG. 1, the evaluation model can be obtained in a block 140. In other words, the evaluation model in the block 140 is obtained particularly for the working line 110. After repeating the process 100 for different working lines, a relatively large library can be obtained, which is beneficial for an optimization process to be introduced in the following.

Figure 2:
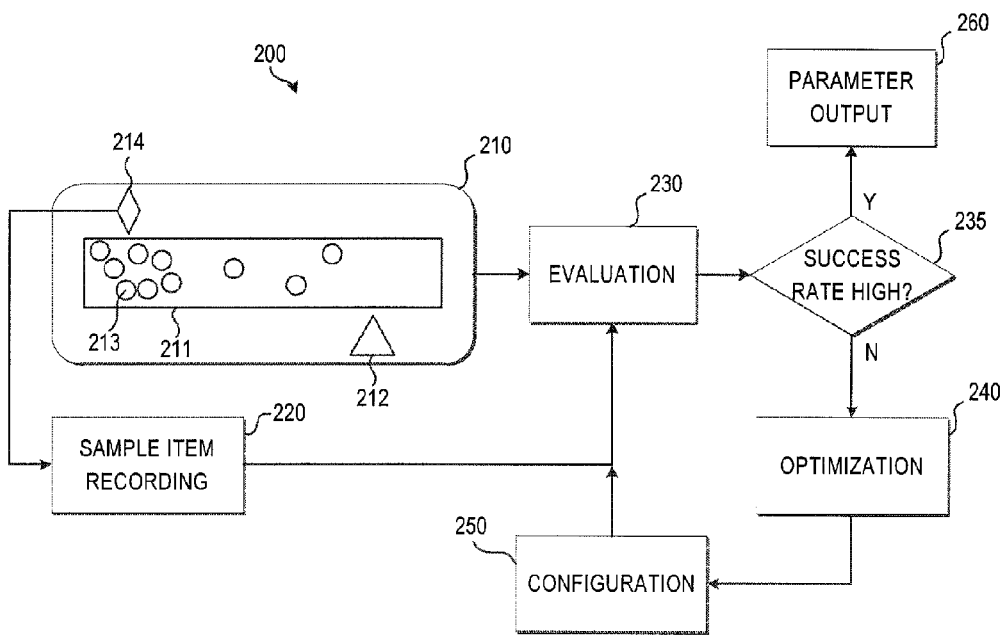
FIG. 2 illustrates an example process flow of updating configuring parameters for the evaluation model for a particular or a target working line in accordance with one example embodiment.

FIG. 2 illustrates an example process flow 200 of updating configuring parameters for the evaluation model for a target working line 210. The target working line 210 is a real working line with its configuring parameters to be adjusted. For example, after finishing the setup of a real working line 210, its initial success rate may be low, and thus the working line 210 needs an optimization. The working line 210 to be optimized includes one or more conveyors 211, one or more robots 212 and a number of items 213 on the conveyor(s) 211. One or more cameras 214 may be included as well to output video clips in a block sample item recording 220. The blocks 210 and 220 correspond to the blocks 110 and 120 in FIG. 1. However, the working line 210 in FIG. 2 is a "target" that needs to be optimized, while the working line 110 in FIG. 1 is the one used to train the evaluation model beforehand.

In the context, measuring parameters are various physical values of a working line that can be directly or indirectly measured by sensors or detectors, such as speed, position, weight and the like. Configuring parameters, on the other hand, are the states of the components of the working line. For example, some configuring parameters can be the moving speed of a conveyor, the pressure applied to an item by a manipulator and the like. By setting the configuring parameters, the measuring parameters are affected as a result. Eventually, the success rate will be affected as well.

In one embodiment, the target working line 210 is followed by an evaluation block 230 which selects a proper evaluation model from the training library for the target working line 210 based on the configurations or settings of the target working line 210. In general, the selected evaluation model can be used to describe the target working line and yield a total success rate accurately based on the measuring parameters. In some examples, a library may not contain a proper evaluation model. In this case, one of the evaluation models can be selected randomly, and corrections can be made to the randomly selected model, for example, in the course of optimization.

In some embodiments, a scenario can be selected based on the target working line 210 from the library, and the library may include a number of preset scenarios. Each of the scenarios corresponds to one evaluation model with a set of measuring parameters as inputs. In this manner, the target working line 210 can be assigned with an evaluation model automatically or by an on-site worker. Then, the evaluation model associated with the selected scenario can be obtained.

After the evaluation block 230, a success rate is yielded accordingly. Then, the yielded rate is compared with a preset threshold rate in a (diamond) block 235 to examine whether the success rate is high enough. If the yielded rate is lower than the preset threshold rate by a predefined difference, it means that the configuring parameters need to be further adjusted. By some predetermined algorithms or models (for example, the algorithms or models are obtained by the method of exhaustion based on a library built up empirically), some of the configuring parameters can be assigned with new value(s) at an optimization block 240, which mirrors a corresponding change of the working line 210. A number of configuring parameters are then updated in a configuration block 250 accordingly. By combining the parameters from the sample item recording 220 and the updated parameters from the configuration block 250, the combined results are transmitted to the evaluation block 230 again, thus forming a closed loop. An updated success rate can be generated in the evaluation block 230 once again and then compared with the preset threshold rate in the block 235. The above processes can be repeated until the difference between the yielded rate and the preset threshold rate is small enough.

On the other hand, if the comparison in the block 235 is satisfying, meaning that the success rate is high enough, the process 200 can end in an output block 260, by which a number of configuring parameters and additionally the corresponding measuring parameters are output to an in-situ machine. With these output parameters, the on-site working line can be optimized effectively and efficiently.

In the optimization process 200, the working line 210 does not need to be a real working line. Instead, in order to speed up the optimization process 200, the entire closed loop can be simulated in software level. To achieve this, a video clip can be sent by on-site workers/engineers to the evaluation block 230, which is capable of extracting the measuring parameters from the video clip. In addition, extra measuring parameters which may not be extracted from the video clip, such as weight, can be provided by the on-site workers/engineers to the evaluation block 230. The configuring parameters updated in the block 250 can be combined with the parameters extracted from the video clip in the block 220, which process is elaborated above.

In this manner, a closed loop simulation can be carried out for the target working line 210 so as to update the configuring parameters, until the success rate reaches a satisfying level. In other words, no real-time running of a working line is needed, and the simulation can be finished in software level, leading to a significant shortening of time needed for the optimization. For instance, the time needed for an on-site optimization by some experienced workers/engineers is a few or even tens of times longer than the optimization process in accordance with the present disclosure. Furthermore, no prior knowledge is needed for personnel to operate the optimization, thus making the optimization more consistent and reliable.

However, in some examples, it is to be appreciated that the configuring parameters can also be adjusted or updated in real time based on an actual overall success rate measured during an operation of the target working line, especially for situations when the actual overall success rate drops below a certain value in the course of the operation of an on-site working line. In some other examples, the configuring parameters can be initialized at the beginning by assigning the configuring parameters of a formerly used working line. After the closed loop self-learning process as discussed above, the configuring parameters can be updated accordingly.

Figure 3:
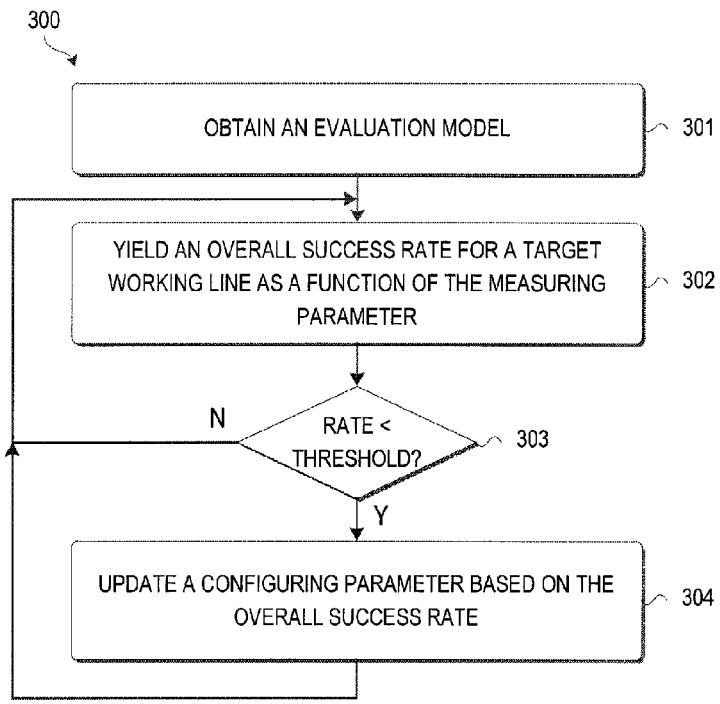
FIG. 3 illustrates an example flow chart showing steps of optimizing a target working line in accordance with one example embodiment.

FIG. 3 illustrates an example flow chart 300 showing steps of optimizing a target working line. In a block 301, an evaluation model is obtained. The evaluation model corresponds to the one obtained in the block 230 shown in FIG. 2, and the target working line corresponds to the one in the block 210 shown in FIG. 2. In a block 302, the overall success rate for the target working line is yielded as a function of a value for the measuring parameter for the target working line. This corresponds to the output of the block 230. In a block 303, a status is determined whether the yielded overall success rate is lower than a predetermined threshold rate. If the answer is "yes," it proceeds to a block 304, in which a value for a configuring parameter is updated based on the overall success rate. The configuring parameter corresponds to the measuring parameter. After the block 304, it returns once again to the block 302 in which a new overall success rate is to be determined. If the block 303 outputs a "no," it will skip the block 304 and return to the block 302.

Figure 4:
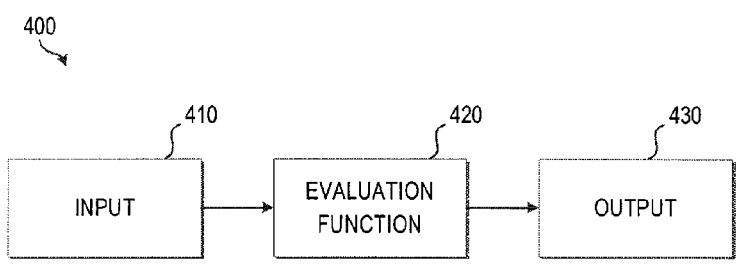
FIG. 4 illustrates an example evaluation model in accordance with one example embodiment.

FIG. 4 illustrates an example evaluation model 400. An input 410 of the evaluation model 400 is shown at the left side of FIG. 4. Such an input 410 can be a number (n) of measuring parameters $k_1, k_2 \ldots k_n$ as discussed above with reference to FIGS. 1 and 2. Each of the measuring parameters $k_1, k_2 \ldots k_n$ can be a variable used in an evaluation function 420. The evaluation function 420 can be in a form of $y=f(k_1, k_2 \ldots k_n)$, where y represents a success rate. An output 430 at the right side of FIG. 4 is the overall success rate or a success rate of a single action. In one example, the overall success rate can be a product of success rates of several actions. The evaluation model 400 is used to "mimic" an actual action occurring in the working line, so that the success rate can be simulated in software level.

In one embodiment, the measuring parameter includes at least one of: attributes associated with the robot manipulator; attributes associated with a first conveyor on which the item is to be picked; attributes associated with the item; and attributes associated with a second conveyor on which the item is to be placed. Specifically, the measuring parameter can be physical attributes such as speed of the manipulator, pose of the manipulator, position of the item, tracking time and the like.

The overall success rate can include a picking success rate, a moving success rate and a placing success rate. The overall success rate can then be a product of the picking success rate, the moving success rate and the placing success rate. The picking success rate defines a probability of the robot manipulator successfully picking the item from a first conveyor ("picking action"). The moving success rate defines a probability of the robot manipulator successfully moving the item from a picking position up over the first conveyor to a placing position up over a second conveyor ("moving action"). The placing success rate defines a probability of the robot manipulator successfully placing the item onto the second conveyor ("placing action"). In one example, the picking action can involve a number of measuring parameters such as speed of the manipulator, position of the manipulator, speed of the item, position of the item, tracking time (a period of time for a robot manipulator to track a particular item or object on the conveyor, when the manipulator is kept still relative to the item or object), weight of the item and the like. The moving action can involve a number of measuring parameters such as speed of the manipulator, weight of the item and the like. The placing action can involve a number of measuring parameters such as speed of the manipulator, position of the manipulator, position of a container (if the item needs to be placed in it), speed of the container, acceleration of the container, speed of the conveyor, weight of the item and the like.

Although the overall success rate can be trained in the block 130 shown in FIG. 1 for example by a function $y=f(k_1, k_2 \ldots k_n)$ discussed above, other forms of the function can be adopted as well. In one embodiment, The evaluation function can be in a form of $x=h(m_1 \ldots m_i)g(n_1 \ldots n_j)$, in which x represents the overall success rate or a success rate of a single action. h represents a switch function, which means that some of the measuring parameters determine a success or a failure directly regardless of the rest of the measuring parameters. For example, positions of the manipulator and the item will determine a success directly because the action fails if the two positions differ too much. $m_i$ represents parameters for the switch function, such as positions of the manipulator and the item/container. g is a weight function representing the success possibility of different measuring parameters which do not directly determine a success or a failure. $n_j$ represents parameters such as speeds of the manipulator and item, accelerations of the manipulator and item, weight of the item and the like.

In one aspect of the present disclosure, an apparatus for optimizing a target working line is disclosed. That apparatus can be an on-site computer, a remote computer or any other processing device that can communicate with the working line and process information obtained therefrom. The target working line includes at least one robot manipulator, at least one conveyor and at least one item on the conveyor to be displaced by the robot manipulator. The apparatus includes: a controller configured to: obtain an evaluation model for the target working line, the evaluation model yielding an overall success rate of moving the item from one conveyor to another conveyor based on at least one measuring parameter, the measuring parameter being a physical attribute of the target working line; yield the overall success rate for the target working line as a function of a value for the measuring parameter for the target working line; and in case that the yielded overall success rate is lower than a predetermined threshold rate, update a value for a configuring parameter based on the overall success rate, the configuring parameter corresponding to the measuring parameter, and the configuring parameter being states of the working line.

In an example embodiment, the controller can be configured to yield the overall success rate for the target working line by generating the value for the measuring parameter from the target working line; and yielding the overall success rate as an output of the obtained evaluation model, with the generated value for the measuring parameter as an input of the obtained evaluation model.

In a further example embodiment, the controller can be configured to generate the value for the measuring parameter by extracting the value for the measuring parameter from a video captured by a camera in the target working line.

In another example embodiment, the measuring parameter can include at least one of the following: attributes associated with the robot manipulator; attributes associated with a first conveyor on which the item is to be picked; attributes associated with the item; and attributes associated with a second conveyor on which the item is to be placed.

In a further example embodiment, the controller can configured to obtain the evaluation model by selecting a scenario based on the target working line from a library including a plurality of scenarios, each of the scenarios corresponding to one evaluation model with a set of measuring parameters as inputs; and obtaining the evaluation model associated with the selected scenario.

In yet another example embodiment, a plurality of evaluation models can be respectively trained in a plurality of in-situ working lines, each of the evaluation model including respective weights for the set of the measuring parameters.

In another example embodiment, the controller can be further configured to: adjust the value for the configuring parameter based on an actual overall success rate measured during an operation of the target working line.

In another example embodiment, the overall success rate can include a picking success rate, a moving success rate and a placing success rate. the picking success rate defines a probability of the robot manipulator successfully picking the item from a first conveyor, the moving success rate defines a probability of the robot manipulator successfully moving the item from a picking position up over the first conveyor to a placing position up over a second conveyor, and the placing success rate defines a probability of the robot manipulator successfully placing the item onto the second conveyor.

In a further embodiment, the overall success rate can be a product of the picking success rate, the moving success rate and the placing success rate.

While operations are depicted in a particular order in the above descriptions, it should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of optimizing a target working line including at least one robot manipulator, at least one conveyor and at least one item on the conveyor to be displaced by the robot manipulator, the method comprising:
   obtaining, by a controller, an evaluation model for the target working line, the evaluation model yielding an overall success rate of moving the item from one conveyor to another conveyor based on at least one measuring parameter, the measuring parameter being a physical attribute of the target working line;
   yielding, by the controller, the overall success rate for the target working line as a function of a value for the measuring parameter for the target working line;
   in case that the yielded overall success rate is lower than a predetermined threshold rate, updating, by the controller, a value for a configuring parameter based on the overall success rate, the configuring parameter corresponding to the measuring parameter, and the configuring parameter being states of the working line; and
   moving the item from the one conveyor to the another conveyor with the robot manipulator using the value for the measuring parameter and the value for the configuring parameter;
   wherein the overall success rate includes a picking success rate, a moving success rate and a placing success rate,
   the picking success rate defining a probability of the robot manipulator successfully picking the item from the one conveyor,
   the moving success rate defining a probability of the robot manipulator successfully moving the item from a picking position up over the one conveyor to a placing position up over the another conveyor, and
   the placing success rate defining a probability of the robot manipulator successfully placing the item onto the another conveyor.

2. The method according to claim 1, wherein yielding the overall success rate for the target working line comprises:
   generating the value for the measuring parameter from the target working line; and
   yielding the overall success rate as an output of the obtained evaluation model, with the generated value for the measuring parameter as an input of the obtained evaluation model.

3. The method according to claim 2, wherein generating the value for the measuring parameter comprises:
   extracting the value for the measuring parameter from a video captured by a camera in the target working line.

4. The method according to claim 1, wherein the measuring parameter includes at least one of the following:
   attributes associated with the robot manipulator;
   attributes associated with the one conveyor on which the item is to be picked;
   attributes associated with the item; and
   attributes associated with the another conveyor on which the item is to be placed.

5. The method according to claim 1, wherein obtaining the evaluation model comprises:
   selecting a scenario based on the target working line from a library including a plurality of scenarios, each of the scenarios corresponding to one evaluation model with a set of measuring parameters as inputs; and
   obtaining the evaluation model associated with the selected scenario.

6. The method according to claim 5, wherein a plurality of evaluation models are respectively trained in a plurality of in-situ working lines, each of the evaluation model including respective weights for the set of the measuring parameters.

7. The method according to claim 1, wherein the method further comprises:
   adjusting the value for the configuring parameter based on an actual overall success rate measured during an operation of the target working line.

8. The method according to claim 1, wherein the overall success rate is a product of the picking success rate, the moving success rate and the placing success rate.

9. The method according to claim 2, wherein obtaining the evaluation model comprises:
   selecting a scenario based on the target working line from a library including a plurality of scenarios, each of the scenarios corresponding to one evaluation model with a set of measuring parameters as inputs; and
   obtaining the evaluation model associated with the selected scenario.

10. The method according to claim 9, wherein a plurality of evaluation models are respectively trained in a plurality of in-situ working lines, each of the evaluation model including respective weights for the set of the measuring parameters.

11. An apparatus for optimizing a target working line including at least one robot manipulator, at least one conveyor and at least one item on the conveyor to be displaced by the robot manipulator, the apparatus comprising:
    a controller configured to:
       obtain an evaluation model for the target working line, the evaluation model yielding an overall success rate of moving the item from one conveyor to another conveyor based on at least one measuring parameter, the measuring parameter being a physical attribute of the target working line;
       yield the overall success rate for the target working line as a function of a value for the measuring parameter for the target working line; and
       in case that the yielded overall success rate is lower than a predetermined threshold rate, update a value for a configuring parameter based on the overall success rate, the configuring parameter corresponding to the measuring parameter, and the configuring parameter being states of the working line; and the robot manipulator configured to:
       move the item from the one conveyor to the another conveyor with the robot manipulator using the value for the measuring parameter and the value for the configuring parameter;
    wherein the overall success rate includes a picking success rate, a moving success rate and a placing success rate,
    the picking success rate defining a probability of the robot manipulator successfully picking the item from the one conveyor,
    the moving success rate defining a probability of the robot manipulator successfully moving the item from a picking position up over the one conveyor to a placing position up over the another conveyor, and
    the placing success rate defining a probability of the robot manipulator successfully placing the item onto the another conveyor.

12. The apparatus according to claim 11, wherein the controller is configured to yield the overall success rate for the target working line by:
    generating the value for the measuring parameter from the target working line; and yielding the overall success rate as an output of the obtained evaluation model, with the generated value for the measuring parameter as an input of the obtained evaluation model.

13. The apparatus according to claim 12, wherein the controller is configured to generate the value for the measuring parameter by:

extracting the value for the measuring parameter from a video captured by a camera in the target line.

14. The apparatus according to claim 11, wherein the measuring parameter includes at least one of the following:

attributes associated with the robot manipulator;

attributes associated with the one conveyor on which the item is to be picked;

attributes associated with the item; and attributes associated with the another conveyor on which the item is to be placed.

15. The apparatus according to claim 14, wherein the controller is configured to obtain the evaluation model by:

selecting a scenario based on the target working line from a library including a plurality of scenarios, each of the scenarios corresponding to one evaluation model with a set of measuring parameters as inputs; and obtaining the evaluation model associated with the selected scenario.

16. The apparatus according to claim 15, wherein a plurality of evaluation models are respectively trained in a plurality of in-situ working lines, each of the evaluation model including respective weights for the set of the measuring parameters.

17. The apparatus according to claim 11, wherein the controller is further configured to:

adjust the value for the configuring parameter based on an actual overall success rate measured during an operation of the target working line.

18. The apparatus according to claim 11, wherein the overall success rate is a product of the picking success rate, the moving success rate and the placing success rate.

* * * * *